(12) United States Patent
Yao et al.

(10) Patent No.: US 11,378,708 B2
(45) Date of Patent: Jul. 5, 2022

(54) DOWNHOLE FLUID DENSITY AND VISCOSITY SENSOR BASED ON ULTRASONIC PLATE WAVES

(71) Applicant: Baker Hughes, a GE company, LLC, Houston, TX (US)

(72) Inventors: Xiaochu Yao, Conroe, TX (US); Douglas J. Patterson, Magnolia, TX (US); Pawel J. Matuszyk, Spring, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 670 days.

(21) Appl. No.: 16/227,609

(22) Filed: Dec. 20, 2018

(65) Prior Publication Data
US 2019/0196041 A1 Jun. 27, 2019

Related U.S. Application Data

(60) Provisional application No. 62/609,486, filed on Dec. 22, 2017, provisional application No. 62/610,139, filed on Dec. 22, 2017.

(51) Int. Cl.
*G01V 1/50* (2006.01)
*G01V 1/46* (2006.01)
(Continued)

(52) U.S. Cl.
CPC .............. *G01V 1/50* (2013.01); *E21B 47/005* (2020.05); *E21B 47/01* (2013.01); *E21B 47/107* (2020.05);
(Continued)

(58) Field of Classification Search
CPC .... G01V 1/50; G01V 1/46; G01V 2210/6224; G01V 2210/673; E21B 47/01;
(Continued)

(56) References Cited

U.S. PATENT DOCUMENTS 4,571,693 A 2/1986 Birchak et al.
5,189,914 A * 3/1993 White .................. G01H 13/00
73/19.03

(Continued)

FOREIGN PATENT DOCUMENTS

| JP | 2010117329 A | 5/2010 |
|---|---|---|
| WO | 2010034713 A2 | 4/2010 |
| WO | 2011078691 A2 | 6/2011 |

OTHER PUBLICATIONS

Martin, S., et al., Sensing in liquids using acoustic plate mode devices:, Electron Devices Meeting, 1987 International, IEEE, May 1987, pp. 290-293.

(Continued)

*Primary Examiner* — Daniel L Murphy
(74) *Attorney, Agent, or Firm* — Cantor Colburn LLP

(57) ABSTRACT

Methods, systems, and devices for downhole evaluation using a sensor assembly that includes a sensor plate, wherein a surface of the sensor plate forms a portion of a surface of a downhole tool. Methods include bringing the surface of the sensor plate into contact with downhole fluid; generating a guided wave that propagates in the sensor plate by activating the sensor assembly at at least one frequency configured to excite both a symmetric mode and an anti-symmetric mode; making at least one first attenuation measurement of the symmetric mode of the guided wave; making at least one second attenuation measurement of the anti-symmetric mode of the guided wave; and using the at least one first attenuation measurement and the at least one second attenuation measurement to estimate at least one parameter of interest of the fluid. Methods may include submerging the surface of the sensor plate in a downhole fluid.

20 Claims, 5 Drawing Sheets

(51) Int. Cl.
*E21B 47/01* (2012.01)
*E21B 47/18* (2012.01)
*E21B 47/005* (2012.01)
*E21B 47/107* (2012.01)

(52) U.S. Cl.
CPC ............... *E21B 47/18* (2013.01); *G01V 1/46* (2013.01); *G01V 2210/6224* (2013.01); *G01V 2210/673* (2013.01)

(58) Field of Classification Search
CPC ...... E21B 47/18; E21B 47/005; E21B 47/107; G01N 29/348; G01N 29/2412; G01N 29/032; G01N 2291/0427; G01N 2291/015
USPC .......................................................... 367/35
See application file for complete search history.

(56) References Cited

U.S. PATENT DOCUMENTS

| | | |
|---|---|---|
| 5,189,915 A | 3/1993 | Reinhart et al. |
| 6,854,338 B2 | 2/2005 | Khuri-Yakub et al. |
| 7,162,918 B2 | 1/2007 | DiFoggio et al. |
| 7,317,989 B2 | 1/2008 | DiFoggio et al. |
| 7,334,452 B2 | 2/2008 | Matsiev et al. |
| 7,552,619 B2 | 6/2009 | Andle |
| 7,784,330 B2 | 8/2010 | Angelescu et al. |
| 7,825,568 B2 | 11/2010 | Andle |
| 8,824,240 B2 | 9/2014 | Roberts et al. |
| 9,121,816 B2 | 9/2015 | Faustmann et al. |
| 9,726,014 B2 | 8/2017 | Khajeh et al. |
| 2009/0216467 A1 | 8/2009 | Andle |
| 2012/0266668 A1 | 10/2012 | Kumar et al. |
| 2015/0322782 A1 | 11/2015 | Khajeh et al. |
| 2019/0145241 A1 | 5/2019 | Yao et al. |

OTHER PUBLICATIONS

Wenzel, S., et al; "A multisensor employing an ultrasonic lamb-wave oscillator", IEEE Transactions on Electron Devices 35 (6) Jun. 1988, 735-743.
Martin, B., et al., Viscosity and density sensing with ultrasonic plate waves, Sensors and Actuators A: Physical 22 (1-3) 1990 704-708.
PCT/US2018/0667205 ISR dtd Apr. 23, 2019.
Wenzel, S., et al., "Liquid Viscosity and Density Measurement with Flexural-Plate-Wave Sensors", Berkeley MicroInstruments, Nov. 1997 9 pp.

* cited by examiner

DOWNHOLE FLUID DENSITY AND VISCOSITY SENSOR BASED ON ULTRASONIC PLATE WAVES

CROSS-REFERENCE TO RELATED APPLICATION

This application claims the benefit of Provisional Patent Application No. 62/609,486 filed Dec. 22, 2017, and Provisional Patent Application No. 62/610,139, filed on Dec. 22, 2017, which are incorporated by reference herein in its entirety.

FIELD OF THE DISCLOSURE

This disclosure generally relates to downhole fluids, and in particular to methods and apparatus for estimating a parameter of interest of a downhole fluid.

BACKGROUND OF THE DISCLOSURE

Determining the acoustic properties of downhole fluids may be desirable for several types of downhole evaluation. Such properties may be used in characterizing the fluid itself, or for use in methods for evaluating the formation, the borehole, the casing, the cement, or for previous or ongoing operations in the borehole including exploration, development, or production.

As one example, it is known to conduct acoustic inspection of a casing cemented in a borehole to determine specific properties related to the casing and surrounding materials. For example, the bond between the cement and the casing may be evaluated, or the strength of the cement behind the casing or the casing thickness may be estimated, using measurements of reflected acoustic waves, which may be generally referred to as casing cement bond logging. Physical properties of fluids vary at different depths of a well. Thus, for many of these techniques, it is desirable that variations in the fluid filling the borehole (e.g., drilling fluid) be compensated for, because conventional processing is highly sensitive to the properties of the fluid. So as one example, localized estimation of downhole fluid impedance may be desirable to enable accurate interpretation of downhole casing inspection measurements.

Thus, various techniques are currently employed to determine parameters of the fluid affecting acoustic measurements, such as acoustic impedance and sound velocity in order to interpret the acoustic reflection data. Traditionally, time of flight of the acoustic signals has been used to determine sound velocity, and additional measurements may be used to estimate at least one of acoustic impedance and density of the fluid.

SUMMARY OF THE DISCLOSURE

In aspects, the present disclosure is related to methods and apparatuses for estimating at least one parameter of interest of a downhole fluid relating to an earth formation intersected by a borehole.

Aspects of the disclosure include methods of downhole evaluation using a sensor assembly that includes a sensor plate, wherein a surface of the sensor plate forms a portion of a surface of a downhole tool. General method embodiments according to the present disclosure may include bringing the surface of the sensor plate into contact with a downhole fluid; generating a guided wave that propagates in the sensor plate by activating the sensor assembly at at least one frequency configured to excite both a symmetric mode and an anti-symmetric mode; making at least one first attenuation measurement of the symmetric mode of the guided wave; making at least one second attenuation measurement of the anti-symmetric mode of the guided wave; and using the at least one first attenuation measurement and the at least one second attenuation measurement to estimate at least one parameter of interest of the downhole fluid. One symmetric mode may be a fundamental symmetric mode and one anti-symmetric mode may be a fundamental anti-symmetric mode. The guided wave may propagate in the plate between the surface and an opposing surface of the plate. General method embodiments according to the present disclosure may include submerging the surface of the sensor plate in a downhole fluid in a borehole.

The sensor assembly may include at least one of: i) an inter-digital transducer (IDT) acoustically coupled to the plate, ii) a wedge transducer, and iii) an electromagnetic acoustic transducer (EMAT) device. The method may include generating the guided wave with the sensor assembly. Methods may include using the at least one first attenuation measurement to estimate a first parameter of interest of the downhole fluid and the at least one second attenuation measurement to estimate a second parameter of interest of the downhole fluid. The first parameter of interest may include a fluid density of the downhole fluid and the second parameter of interest may include a fluid viscosity of the downhole fluid.

Methods may include using the at least one parameter of interest to conduct casing cement bond logging. The guided wave comprises a plurality of wave modes. Methods may include making a plurality of first attenuation measurements of a plurality of symmetric modes of the guided wave and making a plurality of second attenuation measurements of a plurality of anti-symmetric modes of the guided wave. Methods may include generating a plurality of guided waves. Methods may include making a plurality of first attenuation measurements of a plurality of symmetric modes of the plurality of guided waves and making a plurality of second attenuation measurements of a plurality of anti-symmetric modes of the plurality of guided waves.

Aspects of the disclosure may include an apparatus for downhole evaluation in a borehole intersecting an earth formation. The apparatus may include a carrier configured to be conveyed into a borehole filled with downhole fluid; a logging tool mounted on the carrier; and a processor. The logging tool may include a plate having an exterior surface configured to be submerged in the downhole fluid; at least one transmitter coupled to the plate; and at least one receiver coupled to the plate. The logging tool may be configured such that when the borehole is filled with downhole fluid, the surface is immersed in the downhole fluid. The at least one processor may be configured to: generate a guided wave that propagates in the sensor plate by activating the sensor assembly at at least one frequency configured to excite both a symmetric mode and an anti-symmetric mode; make at least one first attenuation measurement of the symmetric mode of the guided wave; make at least one second attenuation measurement of the anti-symmetric mode of the guided wave; and use the at least one first attenuation measurement and the at least one second attenuation measurement to estimate at least one parameter of interest of the downhole fluid.

Further embodiments may include a non-transitory computer-readable medium product having instructions thereon that, when executed, cause at least one processor to perform a method as described above. The non-transitory computer-readable medium product may include at least one of: (i) a ROM, (ii) an EPROM, (iii) an EEPROM, (iv) a flash memory, or (v) an optical disk.

Examples of some features of the disclosure may be summarized rather broadly herein in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1:
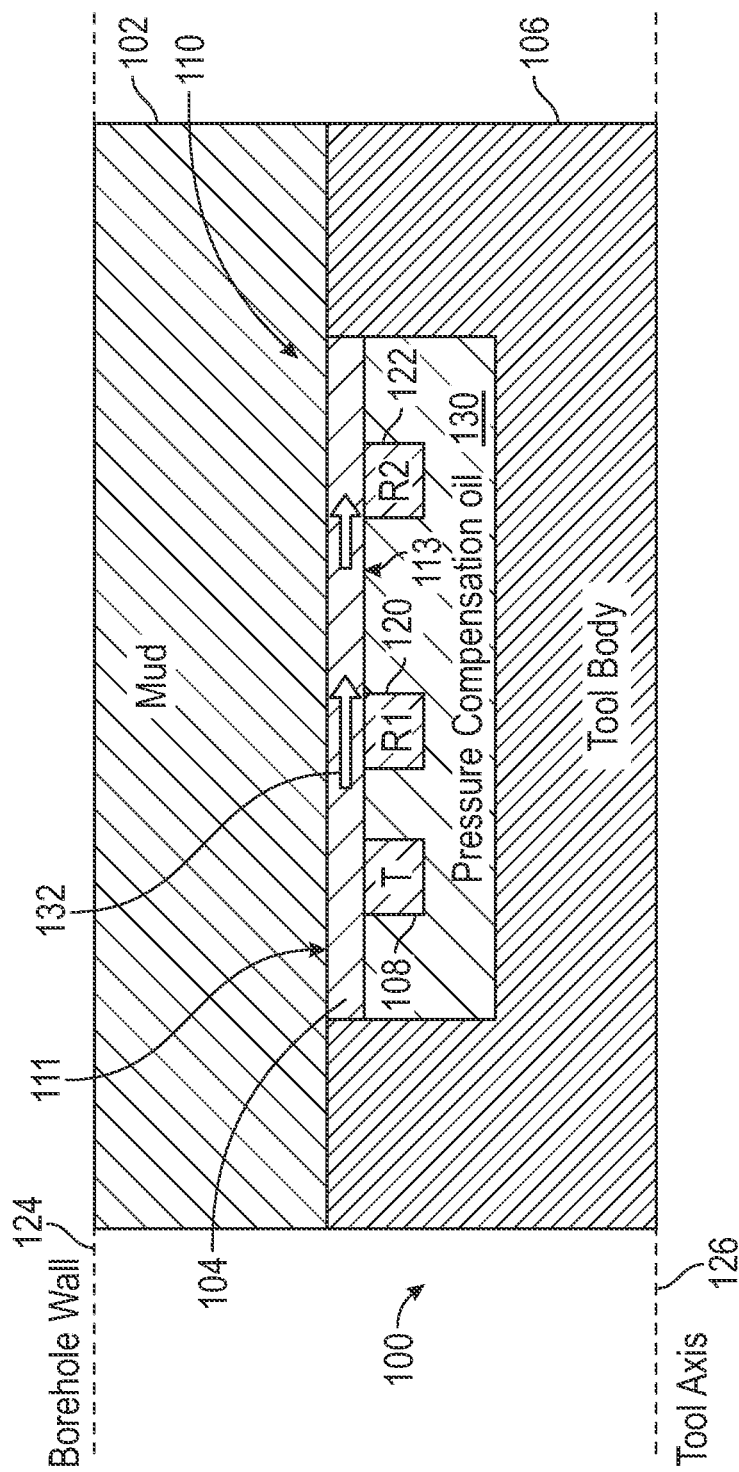
FIG. 1 shows a tool in accordance with embodiments of the present disclosure.

In aspects, this disclosure relates to estimating a parameter of interest of a downhole fluid in an earth formation intersected by a borehole. Various techniques have been used to analyze downhole fluids. Such techniques may include the use of instruments for obtaining information relating to a parameter of interest in conjunction with sample chambers storing the sampled fluid for analysis or sample chambers allowing the fluid to pass through (continuously, or as directed by a flow control) for sampling, or as mounted on an exterior of a tool body of a downhole tool. Example systems may use a signal generator and sensor (which may be combined; e.g., a transducer) for determining acoustic impedance, sound velocity, slowness (i.e., reciprocal of velocity), or other parameters of interest. In the well-known time of flight method, the slowness (i.e., reciprocal of velocity) of a fluid may be determined by dividing the travel time of the signal through the fluid by the distance the signal traveled through the fluid. Other methods have been used to analyze fluids at the surface.

Previous methods of estimation are difficult to implement downhole due to low accuracy, limitations in downhole space, and troublesome mechanical load reliability. Implementation in a logging-while-drilling ('LWD') tool, where the above issues are exacerbated, has proven to be especially problematic. Many approaches introduce a cavity in the tool surface, which consequently may be blocked by debris, which negatively affects measurement accuracy. For example, traditional methods introducing a cavity may show 30 percent error for impedance and 10 percent error (or more) for fluid velocity.

Ultrasonic plate waves as generated using the techniques described herein are more robust than the traditional pulse echo approach. With sophisticated mode selection techniques, the density resolution may reach 0.01 g/cc. Since all the setups are not exposed to the environment (with the exception of the plate), the proposed systems are more likely to survive a high temperature and high pressure downhole environment compared to other methods. With 2×2 transmitting and receiving combo setups, as described in further detail below, fully compensated measurements can be achieved. A PZT transducer's output and sensitivity differences may be canceled out. Further, techniques described herein for measuring absolute fluid density and viscosity do not require tedious calibration or corrections like other methods.

Aspects of the present disclosure use guided waves to determine characteristics of a downhole fluid, such as, for example, acoustic impedance and sound velocity. A "guided wave," as used herein, refers to an acoustic wave transmitted by a process that excites a propagating acoustic wave between two mechanical boundaries. The wave is characterized by two opposing boundaries of propagation defined by a solid-solid, solid-liquid, or solid-gas interface. Thus, the energy of a guided wave is concentrated between parallel boundaries separating different materials, and the wave has a direction of propagation parallel to these boundaries.

Aspects of the present disclosure include methods of measuring downhole fluid density and viscosity in-situ using ultrasonic plate waves. Selected Lamb (LM) and/or SH waves are excited and received using components (e.g., Inter-Digital Transducer ('IDT's)) mounted on one side of a metallic plate, while the other side of the plate is exposed to the downhole fluid for which parameters are to be estimated. The leaky LM wave's attenuation is responsive to parameters of the fluid. For example, the attenuation will change due to the variation of the fluid density and viscosity.

LM modes are a combination of compressional and shear waves propagating in plates. The modes with predominantly normal displacement along the fluid side will largely be affected by fluid density change. The modes with predominantly horizontal displacement along the fluid side will largely be affected by viscosity changes. Therefore, density and viscosity can be characterized independently by mode selection techniques described in greater detail below. Modeling results show that a 0.01 g/cc density increase will result in around 1 dB/ft S0 mode attenuation increase.

It is also desirable in particular applications to excite a variety of wave modes by using a plurality of frequencies, possibly in a plurality of guided waves. The mode selection will coordinate with the plate thickness and material properties of the plate. The optimal firing may be found where the dominant displacement of the LM wave is perpendicular to the plate surface for density measurement. Finding the optimal firing where the dominant displacement of the LM wave is parallel to the plate surface for the viscosity measurements may also be identified, or the SH wave may be employed for viscosity. It is possible to use several different excitations for different modes, and integrate all the result to calibrate the density or viscosity results, thereby making the measurement more accurate and robust. Guided waves may be frequency tuned. See, for example, U.S. patent application Ser. No. 15/809,779 "Guided Wave Attenuation Well Logging Excitation Optimizer Based on Waveform Modeling" to X. Yao et al., incorporated herein in its entirety.

General method embodiments include downhole evaluation using a sensor assembly that includes a sensor plate, wherein a surface of the sensor plate forms a portion of an exterior surface of a downhole tool.

Various parameters of interest may be estimated using the sensor assembly. Techniques employed herein exhibit increased accuracy in comparison to traditional approaches. Further, the small thickness of the sensor assembly allows trouble-free implementation in downhole LWD and wireline tools.

FIG. 1 shows a tool in accordance with embodiments of the present disclosure. In FIG. 1, the tool 100, with tool axis 126, includes a tool body 106 having incorporated therein a sensor assembly 110. The sensor assembly 110 includes a sensor plate 104 at the exterior of the tool body 106, an acoustic transmitter 108, a first acoustic receiver 120 and a second acoustic receiver 122, and control circuitry (not shown) for operating the transmitter and receivers. Alternatively, the plate may be submerged in a body of fluid internal to the tool with a pathway connecting the fluid body to the tool exterior.

The sensor plate 104 includes a surface 111 forming an exterior surface of the tool 100. Sensor plate 104 may be at the circumference of the tool body 106. The tool 100 is configured such that the surface 111 is submerged in a downhole fluid 102 (e.g., drilling mud) upon the tool being submerged. That is, the surface 111 is in contact with (immersed in) the downhole fluid 102 while the tool 100 is conveyed in a fluid filled borehole 124. The tool 100 may also isolate an opposing surface 113 of the sensor plate 104 from the downhole fluid 102, as shown here. Alternatively, the sensor plate 104 may have multiple surfaces in contact with the fluid. If isolated, the opposing surface 113 may be in contact with a compensation fluid 130 (e.g., oil), so that the sensor plate 104 is exposed to fluid 102 on one side and compensation fluid on the other.

Acoustic transmitter 108, such as a transducer (e.g., a transducer) may be positioned at a first location towards a first end of the sensor plate 104 and configured to generate a pulse in the sensor plate 104. Receivers 120 and 122 (e.g., transducers) may be located at known predefined distances from one another and from the transmitter 108. Transducers used in transmitter 108 and receivers 120 and 122 may be any appropriate transducer, such as, for example, IDTs, piezoelectric transducers, magnetostrictive transducers, and so on, as will occur to one of skill in the art. In embodiments, transducers may be electromagnetic acoustic transducers ('EMATs'). The transmitter 108 may be a narrow band transducer with a central frequency at approximately 700 kHz.

Transmitter 108 is configured, in response to excitation of the transmitter 108 by control circuitry, to generate a guided wave 132 that propagates within the plate 104. That is, the guided wave is propagating along the plate 104 parallel with the longitudinal axis of the tool. In other embodiments, the plate 104 may be configured and oriented such that the guided wave propagates along the plate 104 tangent to the tool circumference. Receivers 120 and 122 are configured to detect the propagating wave at their respective locations, and may also be optimized to receive 500 kHz. The configuration may be referred to as a pitch-catch configuration.

In operation, behavior of the guided wave may be used to estimate a related parameter of interest of the system (including the tool, borehole and earth formation), such as, for example, parameters of interest of the downhole fluid. Information from the receivers 120 and 122 corresponding to detection of the guided wave may be indicative of wave behavior (e.g., time-of-flight or attenuation). The particular aspects of wave behavior to be estimated may correspond to the parameter of interest to be estimated.

Embodiments may use attenuation of guided waves in the sensor plate 104 to estimate the density of a fluid ('fluid density') using a model relating attenuation magnitude (e.g., differences in estimated attenuation at locations along the plate) with fluid density. As the sensor plate 104 is exposed to the downhole fluid 102, during the propagation, some of the energy of the guided wave leaks to fluids with which it is in contact, namely, the downhole fluid 102 (and in particular embodiments, compensation fluid 132). The amount of leakage, corresponding to the magnitude of the guided wave attenuation, is dependent upon fluid density and viscosity of the fluid 102. The particular configuration of tool 100 may correspond to the parameter of interest to be estimated as well as an anticipated environment of the borehole, e.g., a predicted range for the parameter of interest.

Ultrasonic plate waves have been used for fluid property measurements under room conditions. These techniques employ a membrane having a thickness of several microns as a wave propagation medium. Loaded with the test fluid, the membrane will change its resonance frequency. The resonance frequency shift may be calibrated to characterize the fluid density and viscosity. Such devices are too fragile to be used in downhole environments featuring high temperature and high pressure. For some environments, for example, a titanium plate of less than 3.5 mm is not expected to survive the downhole environment.

Embodiments described herein include examples featuring a titanium plate of at least 3.5 mm. At this thickness, the presence of the fluid will have substantially no impact on the resonance frequency. Instead, the fluid will largely attenuate any generated LM waves.

Figure 2A:
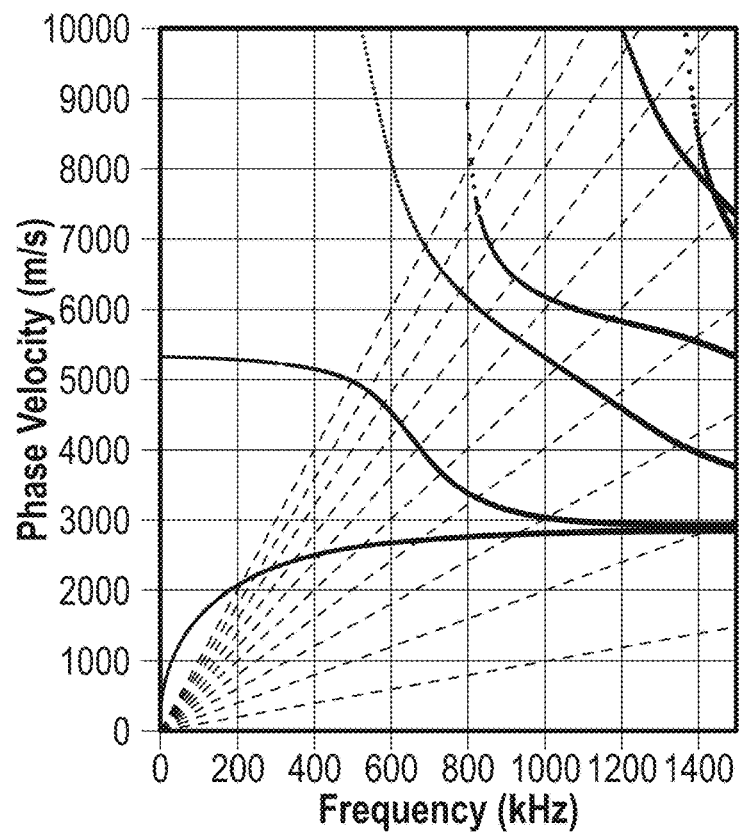
FIGS. 2a and 2b illustrate free plate dispersion curves in accordance with embodiments of the present disclosure.
Figure 2B:
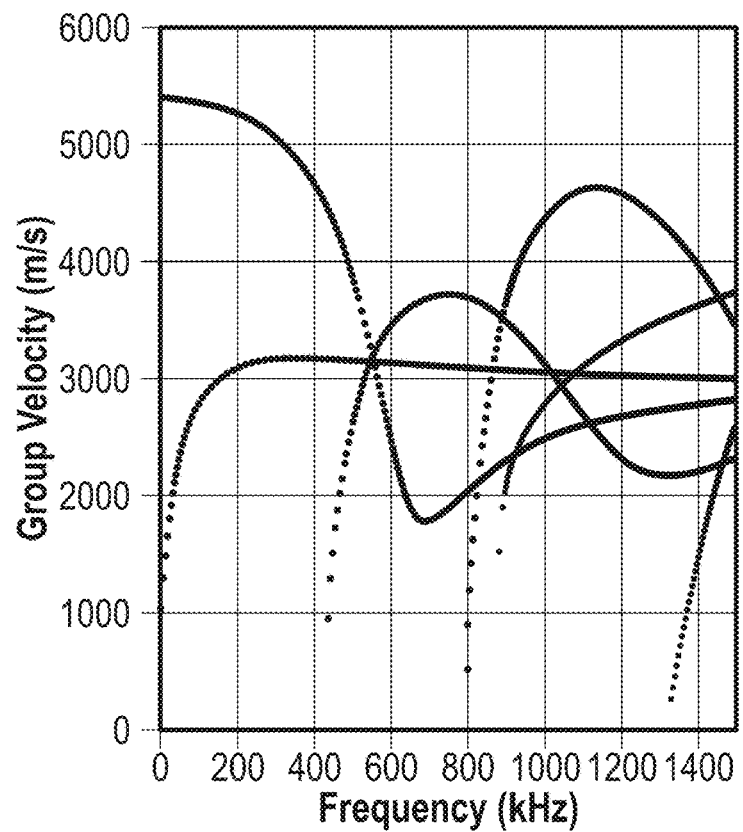

FIG. 2 illustrates free plate dispersion curves in accordance with embodiments of the present disclosure. The left subplot and right subplot are phase velocity and group velocity dispersion curves respectively. Different colors indicate different modes. The fundamental antisymmetric mode A0 mode (blue) and fundamental symmetric S0 mode (red) are the modes of interest here. On the phase velocity dispersion curves, dashed lines show the excitation curves when the wavelength of the excitation pulse varies from 1 mm to 10 mm (bottom to top).

Figure 3:
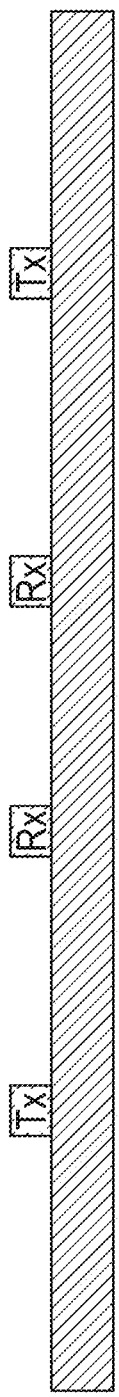
FIG. 3 is a schematic view of a tool in accordance with embodiments of the present disclosure.

FIG. 3 is a schematic view of a tool in accordance with embodiments of the present disclosure. FIG. 3 illustrates the placement of transmitting and receiving components on the tool. IDTs may be a preferred implementation of components for some embodiments in order to precisely control the wavelength of the excitation so as to have a good excitation on the desired modes. For example, in a typical environment, 4 mm wavelength IDTs will excite A0 and S0 modes together around 700 kHz. In particular embodiments, 2×2 combo setups may be employed comprising two transmitting (Tx) IDTs and two receiving IDTs (Rx) as shown in FIG. 3. The two transmitters may fire a sequential signal. This configuration may provide fully compensated attenuation measurements canceling out all the transducer sensitivity differences.

Figure 4:
FIG. 4 shows the results of a COMSOL finite element (FE) model developed to demonstrate the attenuation response for such configuration.

FIG. 4 shows the results of a COMSOL finite element (FE) model developed to demonstrate the attenuation response for such configuration. As shown in FIG. 4, a four alternating elements IDT is mounted on a 3.5 mm thick titanium plate. For model simplification, the receiving IDTs are omitted. The normal displacements are measured instead. In the model, the two receiving probes are 1.5 in. and 2.5 inches away from the center of the transmitting IDT. A three cycle toneburst with center frequency of 700 kHz are used as the excitation pulse. As shown in FIG. 4, the A0 mode waves propagate faster than the S0 mode waves, which agrees with the group velocity dispersion curves. They also have different mode shapes throughout the thickness of the plate. Since these two modes are separated, both of them can be used to characterize properties of the fluid. The velocity of the loading fluid may be kept constant as 1500 m/s, while the density of the fluid may change from 0 to 1100 kg/m$^3$.

Figure 5:
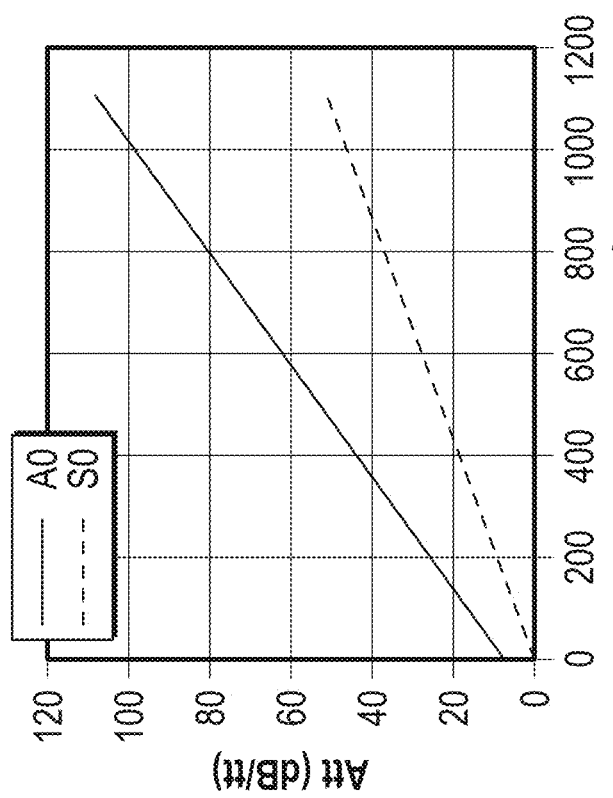
FIG. 5 shows the mode response with respect to density.

FIG. 5 shows the mode response with respect to density. The amplitudes of the A0 and S0 modes may be compared to calculate the attenuation of the modes respectively. As shown in FIG. 5, A0 and S0 mode attenuations may both have a linear response versus fluid density. It is apparent that the S0 mode has a greater sensitivity.

The specific dimensions and material of the sensor plate may be environment and application specific. The plate may be configured such that reflections from ends of the plate do not overlap with the primary signal, and the width facilitates retaining sufficient energy for a 3D waveguide. The thickness of the plate may be configured to optimize frequency and dispersion curves. For example, in one implementation, the plate may be 30 centimeters by 1 centimeter by 3 millimeters, for which the transmitter may be located 7.5 centimeters from the edge of the plate. In other implementations, the plate may be shortened to 22 centimeters. The closer receiver may be located approximately 8.5-10 centimeters from the transmitter and the receivers may be at a distance approximately 1 centimeter apart from one another. One suitable material for the sensor plate is titanium, which may have mechanical strength and other physical characteristics consistent with use in downhole applications. Additional surfaces of the sensor plate may also be incorporated into the exterior surface of the tool while being ignored as a media for wave propagation.

Figure 6:
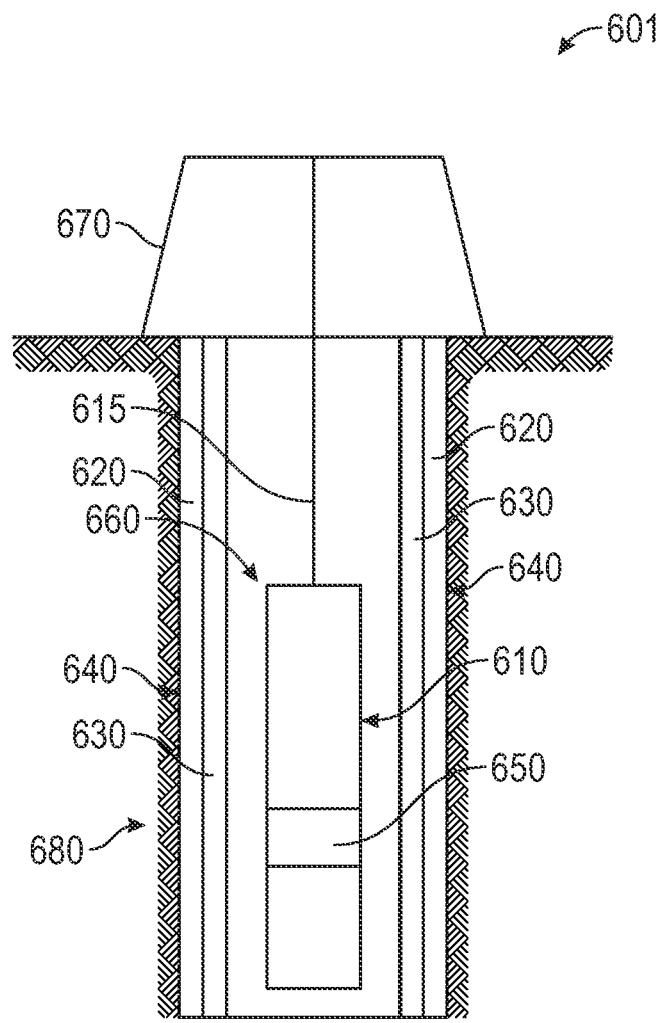
FIG. 6 illustrates a tool in accordance with embodiments of the present disclosure.

FIG. 6 illustrates a tool in accordance with embodiments of the present disclosure. The tool 610 is configured to be conveyed in a borehole intersecting a formation 680. The borehole wall 640 is shown lined with casing 630 filled with a downhole fluid 660, such as, for example, drilling fluid. Cement 620 fills the annulus between the borehole wall 640 and the casing 630. In other embodiments, the system may not have either or both of the casing and cement. For example, the borehole may be newly drilled.

In one illustrative embodiment, the tool 610 may contain a sensor assembly 650, including, for example, one or more acoustic transmitters and receivers (e.g., transducers), configured for evaluation of the cement bond existing between the system of the casing 630, the borehole wall 640, and the cement 620 occupying the annular space between the casing and the borehole wall according to known techniques. For example, electronics in the tool 610, at the surface, or elsewhere in system 601 (e.g., at least one processor) may be configured to use acoustic measurements to determine properties of the cement bond using known techniques, such as, for example, analysis of casing resonance.

The system 601 may include a conventional derrick 670. A conveyance device (carrier 615) which may be rigid or non-rigid, may be configured to convey the downhole tool 610 into wellbore 640 in proximity to formation 680. The carrier 615 may be a drill string, coiled tubing, a slickline, an e-line, a wireline, etc. Downhole tool 610 may be coupled or combined with additional tools. Thus, depending on the configuration, the tool 610 may be used during drilling and/or after the wellbore (borehole) 640 has been formed. While a land system is shown, the teachings of the present disclosure may also be utilized in offshore or subsea applications. The carrier 615 may include embedded conductors for power and/or data for providing signal and/or power communication between the surface and downhole equipment. The carrier 615 may include a bottom hole assembly, which may include a drilling motor for rotating a drill bit to extend the borehole, and a system for circulating a suitable drilling fluid (also referred to as the "mud") under pressure.

The system 601 may include sensors, circuitry and processors for providing information about downhole measurements by the tool and control of the tool or other system components. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art.

A point of novelty of the system is that the processors (at the surface and/or downhole) are configured to perform certain methods (discussed below) that are not in the prior art. More specifically, tool 610 may include an apparatus for estimating one or more parameters of the downhole fluid, which may comprise tool 100, sensory assembly 110 or other devices or tools in accordance with embodiments of the present disclosure. In general embodiments, processors may be configured to use the apparatus to produce information indicative of the downhole fluid (e.g., drilling fluid). One of the processors may also be configured to estimate from the information a parameter of interest of the downhole fluid. Sensor assembly 650 may include sensor assembly 110.

As shown, plate 104 may be positioned substantially flush with the tool body 106. The substantially flush configuration reduces the likelihood of pack off (clogging by drilling mud solids) because the face is substantially the only part of the instrument in contact with the drilling fluid.

In some embodiments, some (or all) of the sensor assembly 650 may protrude from the tool body into the borehole 50. In other embodiments, the tool may include a fluid testing assembly configured to extract downhole fluid from the borehole and deliver the fluid to sensor assembly 110 for testing. The fluid testing assembly may include a sample chamber which may be filled and emptied via the use of various valves, or may operate using a continuous flow line. The sensor assembly 110 may be configured such that plate 104 is located in a sample chamber, a flow line, or elsewhere in the fluid testing assembly. For example, the plate 104 may form a portion of an interior surface of a sample chamber. In particular embodiments, a fluid mover such as a single-action or dual action piston pump may be used. In some embodiments, the fluid mover may include a draw piston. The pumps may be energized by the same power source or independent power sources. The power source may be electric, hydraulic, pneumatic, etc. Additional samples may be drawn and tested in the same location, or the tool may be moved to various locations along the borehole and re-engaged with the borehole wall to draw and test additional samples. In other embodiments, the fluid test instrument may sample and measure fluid without engagement of the borehole wall.

The tool or system may include circuitry directing and controlling the taking of measurements using the instrument. Circuitry may include a controller operatively connected to the sensor assembly 650. The controller may be implemented as at least one processor described herein and/or other supporting circuitry. In some arrangements, the sampling event may be human initiated. For example, sensors may transmit signals representative of one or more selected operating parameters to the surface. Based on these measurements, a human operator may initiate a sampling event. In other arrangements, various processors may be used, alone or in combination, to control the operation of the tool to ensure that sample retrieval occurs at desired times and/or at specified conditions.

Figure 7:
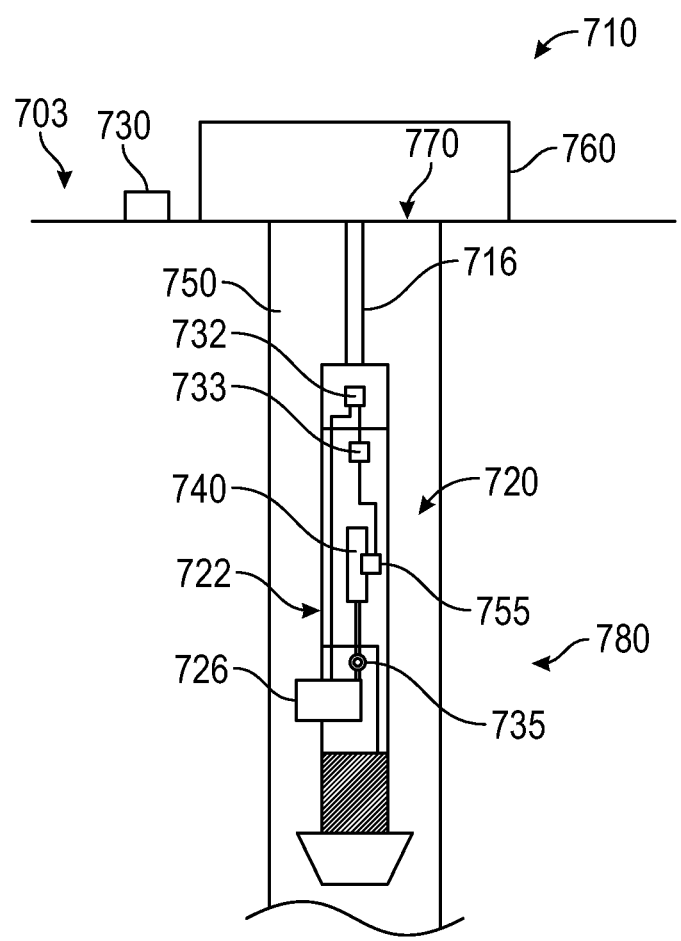
FIG. 7 illustrates a tool configured to gather a downhole fluid from outside of the tool for analysis interior to the tool in accordance with embodiments of the present disclosure.

FIG. 7 illustrates a tool configured to gather a downhole fluid from outside of the tool for analysis interior to the tool in accordance with embodiments of the present disclosure. FIG. 7 illustrates a tool test instrument 722, which includes collector 726 configured to gather a downhole fluid from outside of the tool for analysis downhole. For example, the collector 726 may extract wellbore fluids, formation fluid from the formation 780, and so on. The fluid test instrument 722 also includes a sample chamber 740 and sensor 755.

The system 710 may include a conventional derrick 760 erected on a derrick floor 770. A carrier 716, which may be rigid or non-rigid, may be configured to convey the downhole tool 720 into wellbore 750 (also called the borehole) in proximity to formation 780.

Downhole tool 720 may be coupled or combined with additional tools, including tool test instrument 722. While a land system is shown, the teachings of the present disclosure may also be utilized in offshore or subsea applications. The carrier can also provide communications between the downhole tool 720 and a surface controller 730 disposed at the surface of the earth 703. The earth formation 780 may include any subsurface material of interest such as a downhole fluid. The downhole tool 720 may include sensors for estimating parameters relating to the formation 780.

In order to operate the downhole tool 720 and/or provide a communications interface with the surface controller 730, the downhole tool 720 may include a downhole controller 732. In some embodiments, controllers 732, 733 may include mechanical, electromechanical, and/or electrical circuitry configured to control one or more components of the tool 720. In other embodiments, controllers 732, 733 may use algorithms and programming to receive information and control operation of the tool 720.

The downhole tool 720 includes fluid tester 722 with a sensor array 755 for estimating parameters of a downhole fluid such as, for example, sensor assembly 110. Fluid tester 722 is operatively connected to instrument controller 733 in order to operate the fluid tester 722 and/or provide a communications interface with other controllers. Instrument controller 733 may be incorporated into downhole controller 732, or may be associated with fluid tester 722. Sensor 755 may include, for example, an optical sensor assembly, a resonator assembly, an acoustic transducer assembly, or other sensors in accordance with the present disclosure.

In the embodiment depicted in FIG. 7, the fluid tester 722 includes collector 726 configured to gather a downhole fluid from outside of the tool for analysis downhole. For example, the collector 726 may extract wellbore fluids, formation fluid from the formation 780, and so on. The fluid tester 722 also includes a sample chamber 740.

The collector 726 includes a fluid mover 735 that sends a sample of the gathered downhole fluids to the sample chamber 740, where sensor array 755 takes measurements of the sample. The sensor array 755 is in contact with the sample in the sample chamber 740. Control of the sensor array 755 may be performed by downhole controller 732 or instrument controller 733.

Tool 720 may include embodiments with elastomeric pads urged against the borehole wall, or may draw fluid from the annulus between the borehole wall and the tool. Other embodiments may sample fluid moving continuously through a flow line. In particular embodiments, the fluid mover may be a single-action or dual action piston pump. The pumps may be energized by the same power source or independent power sources. The power source may be electric, hydraulic, pneumatic, etc. The tool 720 may include anchoring, stabilizing and sealing elements disposed on a drill string, such as grippers and packers.

Methods according to the present disclosure may include a first step of submerging the surface of the sensor plate in a downhole fluid in a borehole, which may be carried out by conveying the tool in the borehole. A second step includes generating a guided wave that propagates in the sensor plate by activating the sensor assembly at at least one frequency configured to excite both a symmetric mode and an anti-symmetric mode. A third step includes making at least one first attenuation measurement of the symmetric mode of the guided wave. A fourth step includes making at least one second attenuation measurement of the anti-symmetric mode of the guided wave. A fifth step includes using the at least one first attenuation measurement and the at least one second attenuation measurement to estimate at least one parameter of interest of the downhole fluid. One symmetric mode may be a fundamental symmetric mode and one anti-symmetric mode may be a fundamental anti-symmetric mode. The guided wave may propagate in the plate between the surface and an opposing surface of the plate. The steps are described as first, second, and so on, but may be carried out in any order, including repeating steps or a sequence of steps.

The sensor assembly may include at least one of: i) an inter-digital transducer (IDT) acoustically coupled to the plate, and ii) an electromagnetic acoustic transducer (EMAT) device. The method may include generating the guided wave with the sensor assembly. Methods may include using the at least one first attenuation measurement to estimate a first parameter of interest of the downhole fluid and the at least one second attenuation measurement to estimate a second parameter of interest of the downhole fluid. The first parameter of interest may include a fluid density of the downhole fluid and the second parameter of interest may include a fluid viscosity of the downhole fluid.

Methods may include using the at least one parameter of interest to conduct casing cement bond logging. The guided wave comprises a plurality of wave modes. Methods may include making a plurality of first attenuation measurements of a plurality of symmetric modes of the guided wave and making a plurality of second attenuation measurements of a plurality of anti-symmetric modes of the guided wave. Methods may include generating a plurality of guided waves. Methods may include making a plurality of first attenuation measurements of a plurality of symmetric modes of the plurality of guided waves and making a plurality of second attenuation measurements of a plurality of anti-symmetric modes of the plurality of guided waves.

In some embodiments, processors may include electromechanical and/or electrical circuitry configured to carry out the methods disclosed herein. In other embodiments, processors may use algorithms and programming to receive information and control operation of the apparatus. Therefore, processors may include an information processor that is in data communication with a data storage medium and a processor memory. The data storage medium may be any standard computer data storage device, such as a USB drive, memory stick, hard disk, removable RAM, EPROMs, EAROMs, flash memories and optical disks or other commonly used memory storage system known to one of ordinary skill in the art including Internet based storage. The data storage medium may store one or more programs that when executed causes information processor to execute the disclosed method(s). Herein, "information" may include raw data, processed data, analog signals, and digital signals.

Method embodiments described above may optionally estimate one or a plurality of parameters of interest of the downhole fluid. As described, estimation of each parameter may be carried out using a corresponding technique, such as, for example, the generation of a particular guided wave mode. Estimating a combination of parameters may include using the same transmitters and receivers at different times, using the same transmitters and receivers at different times, using different transmitters and receivers, using the same transmitter and different receivers, and so on. In some cases, estimating the combination of parameters may be carried out using different tools.

For convenience, certain definitions are now presented. The term "acoustic signal" relates to the pressure amplitude versus time of a sound wave or an acoustic wave traveling in a medium that allows propagation of such waves. In one embodiment, the acoustic signal can be a pulse. The term "acoustic transducer" relates to a device for transmitting (i.e., generating) an acoustic signal or receiving an acoustic signal. When receiving the acoustic signal in one embodiment, the acoustic transducer converts the energy of the acoustic signal into electrical energy. The electrical energy has a waveform that is related to a waveform of the acoustic signal.

The term "carrier" (or "conveyance device") as used above means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, BHAs, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "processor" herein includes, but is not limited to, any device that transmits, receives, manipulates, converts, calculates, modulates, transposes, carries, stores or otherwise utilizes information. A processor refers to any circuitry performing the above, and may include a microprocessor, resident memory, and/or peripherals for executing programmed instructions, application specific integrated circuits (ASICs), field programmable gate arrays (FPGAs), or any other circuitry configured to execute logic to perform methods as described herein. Fluid, as described herein, may refer to a liquid, a gas, a mixture, and so on. Predicted formation permeability and predicted formation mobility refer to values predicted for the formation and used to estimate the correction factor. Predicted values may be predicted from lithology, estimated from other estimation techniques, obtained by analogy, and so on, but are distinguished from parameters of interest estimating according to the methods disclosed herein.

Non-limiting examples of downhole fluids include drilling fluids, return fluids, formation fluids, production fluids containing one or more hydrocarbons, oils and solvents used in conjunction with downhole tools, water, brine, engineered fluids, and combinations thereof. Compensation fluid, as used herein, refers to fluid contributing to pressure compensation—that is, a fluid contributing to the structural or functional integrity of the tool under elevated pressures common in a borehole environment (e.g., 10-20 kilopascals).

While the disclosure has been described with reference to example embodiments, it will be understood that various changes may be made and equivalents may be substituted for elements thereof without departing from the scope of the disclosure. In addition, many modifications will be appreciated to adapt a particular instrument, situation or material to the teachings of the disclosure without departing from the essential scope thereof. Further embodiments may include direct measurement wireline embodiments, drilling embodiments employing a sample chamber, LWT tools, including drop subs and the like, and so on. While the present disclosure is discussed in the context of a hydrocarbon producing well, it should be understood that the present disclosure may be used in any borehole environment (e.g., a geothermal well) with any type of downhole fluid.

While the foregoing disclosure is directed to particular embodiments, various modifications will be apparent to those skilled in the art. It is intended that all variations be embraced by the foregoing disclosure.

What is claimed is:

1. A method of downhole evaluation using a sensor assembly that includes a sensor plate, wherein a surface of the sensor plate forms a portion of a surface of a downhole tool, the method comprising:
   bringing the surface of the sensor plate into contact with a downhole fluid;
   generating a guided wave that propagates in the sensor plate by activating the sensor assembly at at least one frequency configured to excite both a symmetric mode and an anti-symmetric mode;
   making at least one first attenuation measurement of the symmetric mode of the guided wave;
   making at least one second attenuation measurement of the anti-symmetric mode of the guided wave; and
   using the at least one first attenuation measurement and the at least one second attenuation measurement to estimate at least one parameter of interest of the downhole fluid.

2. The method of claim 1 wherein the symmetric mode is a fundamental symmetric mode and the anti-symmetric mode is a fundamental anti-symmetric mode.

3. The method of claim 1, wherein the guided wave propagates in the plate between the surface and an opposing surface of the plate.

4. The method of claim 1 wherein the sensor assembly includes at least one of: i) an inter-digital transducer (IDT) acoustically coupled to the plate, and ii) an electromagnetic acoustic transducer (EMAT) device; the method comprising generating the guided wave with the sensor assembly.

5. The method of claim 1 comprising using the at least one first attenuation measurement to estimate a first parameter of interest of the downhole fluid and the at least one second attenuation measurement to estimate a second parameter of interest of the downhole fluid.

6. The method of claim 5 wherein the first parameter of interest comprises a fluid density of the downhole fluid and the second parameter of interest comprises a fluid viscosity of the downhole fluid.

7. The method of claim 5 further comprising using the at least one parameter of interest to conduct casing cement bond logging.

8. The method of claim 1 wherein the guided wave comprises a plurality of wave modes.

9. The method of claim 8 comprising making a plurality of first attenuation measurements of a plurality of symmetric modes of the guided wave and making a plurality of second attenuation measurements of a plurality of anti-symmetric modes of the guided wave.

10. The method of claim 1 comprising generating a plurality of guided waves.

11. The method of claim 10 comprising making a plurality of first attenuation measurements of a plurality of symmetric modes of the plurality of guided waves and making a plurality of second attenuation measurements of a plurality of anti-symmetric modes of the plurality of guided waves.

12. The method of claim 1 further comprising immersing the surface of the sensor plate in the downhole fluid.

13. The method of claim 1 wherein the surface is an exterior surface and the borehole is filled with the downhole fluid, the method further comprising submerging the surface of the sensor plate in the fluid in the borehole.

14. The method of claim 1, wherein the symmetric mode and an anti-symmetric mode are excited at around 700 kHz central frequency or less.

15. An apparatus for downhole evaluation in a borehole intersecting an earth formation, the apparatus comprising:
 a carrier configured to be conveyed into a borehole filled with downhole fluid;
 a logging tool mounted on the carrier, the logging tool including:
  a plate having a surface configured to be brought into contact with the downhole fluid;
  at least one transmitter coupled to the plate;
  at least one receiver coupled to the plate; and
  at least one processor configured to:
   generate a guided wave that propagates in the plate by activating the sensor assembly at at least one frequency configured to excite both a symmetric mode and an anti-symmetric mode;
   make at least one first attenuation measurement of the symmetric mode of the guided wave;
   make at least one second attenuation measurement of the anti-symmetric mode of the guided wave; and
   use the at least one first attenuation measurement and the at least one second attenuation measurement to estimate at least one parameter of interest of the downhole fluid.

16. The apparatus of claim 15 wherein the logging tool is configured such that when the borehole is filled with downhole fluid, the surface is immersed in the downhole fluid.

17. The apparatus of claim 16 wherein the surface configured to be brought into contact with the downhole fluid is an exterior surface.

18. The apparatus of claim 15 wherein the logging tool comprises a sample chamber configured to hold the downhole fluid such that the downhole fluid is in contact with the surface of the plate.

19. The apparatus of claim 15 wherein the logging tool comprises a flow line configured to place the downhole fluid in contact with the surface of the plate.

20. The apparatus of claim 15, wherein the plate is at least 3.5 mm in thickness.

* * * * *